2,695,292
PRODUCTION OF 4-AMINO PYRIMIDINES

John E. Mahan and Stanley D. Turk, Bartlesville, Okla., assignors to Phillips Petroleum Company, a corporation of Delaware No Drawing. Application November 20, 1950, Serial No. 196,719

13 Claims. (Cl. 260—256.4)

This invention relates to a process for the production of pyrimidines. In one of its aspects this invention relates to a process for the production of 4-amino pyrimidines. This invention is useful for the production of 4-amino pyrimidines by the catalytic polymerization of selected nitriles.

Polymerization processes for the formation of pyrimidines by heating acetonitrile in the presence of sodium ethoxide, potassium methoxide, or sodium metal are well known in the art, but the relative amount of activating material that is used has always been large, often equal to the amount of acetonitrile that is used. When so operating the yield of pyrimidine is small under the most favorable conditions, and destruction of the alcoholate or other activator by hydrolysis or other means is essential to isolation of the product. Such processes are obviously expensive due to excessive consumption of the activating materials, and the need for a more economical procedure is quite apparent.

It is also known that such polymerization processes can be effected in the presence of small but catalytic amounts of an alkali metal alkoxide, but the yields obtained with such a catalyst are usually insufficient to make the processes economically desirable since, as the data hereinbelow show, the catalysts we employ produce a greater yield of pyrimidines than the prior art catalysts.

It is an object of this invention to provide a novel and an economical process for producing pyrimidines.

Another object of this invention is to produce pyrimidines by the polymerization of nitriles in the presence of relatively small amounts of a metal hydride as a catalyst.

A further object of this invention is to polymerize nitriles in the presence of catalysts not heretofore used to effect this polymerization reaction.

Additional objects will be readily manifest from our disclosure herein.

We have found that certain nitriles can be converted or polymerized into pyrimidines in high yields by heating in the presence of catalysts that are novel for this reaction and produce greater yields of pyrimidines than the prior art catalysts.

The nitriles that are employed in practicing our invention are those organic nitriles wherein the—C≡N group is attached to a carbon atom bearing at least two hydrogen atoms and corresponding to the general formula

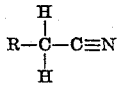

In this general formula R may represent hydrogen, an alkyl radical containing from one to ten, preferably no more than six carbon atoms in the radical, an aryl radical, an arlkyl radical or a substituted aryl radical wherein the substituent radical may be any radical that will not hinder the polymerization reaction or tend to form compounds other than the polymerization products as the principal products of the reaction. Examples of typical nitriles are acetonitrils, propionitrile, butyronitrile, valeronitrile, capronitrile, hexyl cyanide, caprylonitrile, phenylacetonitrile, phenylpropionitrile, phenylbutyronitrile, p-methyl phenylacetonitrile, o-methyl phenylacetonitrile, p-butyl phenylacetonitrile, o-butyl phenylacetonitrile, o-nitrophenylacetonitrile, p-nitrophenylacetonitrile, o-nitrophenylbutyronitrile and p-nitrophenylbutyronitrile.

The pyrimidines resulting from our process are those compounds having the general formula

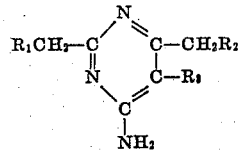

wherein $R_1$, $R_2$ and $R_3$ represent radicals that correspond to the definition for R in the general formula for the nitrile indicated hereinabove. $R_1$, $R_2$ and $R_3$ will be indentical when a single nitrile, such as acetonitrile, is polymerized. Then, the general equation for the reaction is

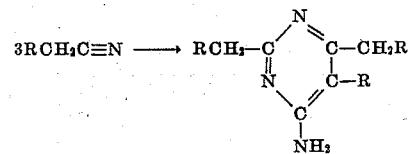

wherein R complies with the above definition for this radical.

It is also within the scope of our invention that mixtures of nitriles may be polymerized in accordance with our process, and in that event the $R_1$, $R_2$ and $R_3$ radicals in the general formula for the pyrimidines will not be identical. As a typical example, a mixture of propionitrile and acetonitrile may be polymerized by using equimolar ratios of reactants to form pyrimidines having the formulae $C_8H_{13}N_3$ and $C_7H_{11}N_3$. Also, the molar ratios of reactants may be varied to produce essentially only one pyrimidine as the principal reaction product. For example, a mixture of two mols of propionitrile and one mole of acetonitrile may be polymerized to form $C_8H_{13}N_3$ as the principal reaction product. Aliphatic nitriles higher boiling than propionitrile may also be used to produce polymers of mixed nitriles, and polymers can be produced from mixtures of aliphatic and aromatic nitriles. For example, mixtures of either acetonitrile or propionitrile and phenylacetonitrile may be polymerized to form the corresponding pyrimidines.

In an additional feature of our invention three different nitriles, corresponding to the above general formula, may be polymerized to form useful pyrimidines. A typical mixture of three different nitriles that may be used in this feature of our invention contains acetonitrile, propionitrile and phenylacetonitrile, but other possible mixtures will be readily apparent to those skilled in the art from our disclosure. When using three different nitriles the general equation for our process may be expressed as

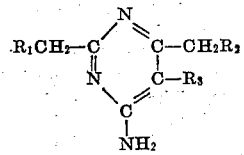

wherein $R_1$, $R_2$ and $R_3$ are different but within the definition for R as expressed above.

The catalysts that are employed to practice our invention are metal hydrides. The hydrides of the alkali metals, such as sodium, potassium and lithium, and of the alkaline earth metals, such as calcium, barium and strontium, are particularly suitable for our process, but other metallic hydrides can be used. For example, lithium-aluminum hydride, which is available commercially in the solid form and has the formula LiAlH₄, can be used in our process. In practicing our invention the catalysts may be added to the reaction in any suitable form, but we have found it desirable to use the catalysts in a finely divided or a powdery solid form.

The catalysts we employ are novel for this polymerization reaction, and, therefore, it is within the scope of our invention to use these catalysts in any desired concentration based on the nitrile or nitriles being polymerized. However, for economical reasons we employ small but catalytic amounts of the catalyst, and a catalyst concentration not greater than 4 per cent and within the range of 0.01 to 4 per cent by weight of the nitrile or nitriles being polymerized is preferred. Our most preferred catalyst concentration is within the range of 0.5 to 2 per cent by weight of the nitrile or nitriles employed.

As indicated above other catalysts, for example, alkali metal alkoxides, have been used for this polymerization reaction. However, our catalysts are superior to these prior art catalysts. The data set forth in the examples hereinbelow demonstrate that improved yields of pyrimidines are obtainable with our catalysts as compared with the yields of product obtained with the prior art catalysts.

In the prior art it has also been suggested that condensing agents in general can be used to catalyze this condensation reaction to form pyrimidines. However, we have found that certain condensing agents will not catalyze the reaction. For example, piperidine, sodium cyanide, and acetonitrile trimer (4-amino-2,6-dimethylpyrimidine) do not catalyze this reaction. The ineffectiveness of these condensing agents will be shown in greater detail in the specific examples hereinbelow.

The nitrile reactants that we use are readily available commercially, and, if desired, they can be used as obtained. We found that these commercial nitriles contain water in an amount sufficient to affect the results significantly and that improved results are obtained by using nitriles that have been dried prior to use. For example, the acetonitrile that we obtained commercially contained 0.66 per cent water, and the maximum yield of 4-amino-2,6-dimethylpyrimidine obtainable at a temperature of 300° F. and at catalyst concentration of 0.005 mols of sodium hydride per mol of acetonitrile was 15 to 16 weight per cent. Also, there was essentially no difference between the yield at four hours reaction time and eight hours reaction time. Under similar conditions of temperature and catalyst concentration, acetonitrile which had been dried by distillation from phosphorous pentoxide and had a water content of 0.05 per cent gave a 49.1 weight per cent yield of similar product at four hours reaction time and a yield of 62.7 weight per cent after eight hours reaction time.

The conditions at which our process is effected are also dependent upon the nitrile or nitriles being polymerized. In general, the temperature is within the range of 150 to 550° F., preferably 300 to 500° F. The reaction pressure is also dependent upon the reaction temperature, and it is usually sufficiently high to maintain a liquid phase in the reaction zone, usually from 30 to 500 p. s. i. g. We also prefer to employ a suitable means for agitating the reactant mixture. In small scale or laboratory work, an electrically driven platform rocker provides adequate agitation, but in operations on a larger scale other means, such as electrically driven stirrers or agitators are more desirable. If desired, suitable solvents inert toward the catalysts employed, such as benzene, pyridine and the like, may be used. The use of a solvent is sometimes desirable to facilitate handling the polymerization products of our process.

It will be readily apparent to one skilled in the art that the reaction or contact time should be sufficient to effect the desired polymerization and to provide a high degree of conversion of the nitrile or nitriles to the desired products. The contact time will usually fall within the range of 30 minutes to 20 hours.

According to the process of our invention a substantially anhydrous nitrile is heated to a temperature of 150 to 550° F. under sufficient pressure to maintain essentially liquid phase conditions in the presence of extremely small amounts of the catalyst for a period of time sufficient to provide a high degree of conversion of the nitrile to a polymeric product, usually from ½ to 20 hours. In the practice of our invention we have found it convenient to seal the nitrile together with the catalyst in a pressure tight reactor and to carry out the reaction under the pressure generated at the reaction temperature. Efficient agitation of the system by stirring or other suitable means during heating is desirable. When the reaction is complete, the reactor and its contents are allowed to cool to room temperature and the crude product is removed and purified. A suitable method for effecting purification comprises codistilling the crude product with a purified odorless kerosene fraction boiling in the range from 356 to 410° F. The 4-amino-pyrimidine separates from the distillate in snow white crystals which are filtered, washed with petroleum ether, and dried. The kerosene filtrate is returned to the kettle for further use as a distillate carrier.

In the above description of our invention and in the specific examples below we have described only a batchwise operation, but our process is readily adaptable to a continuous operation, when desired. Obviously, this latter type of operation will require suitable means for the continuous introduction of reactants to the reaction zone and for the continuous removal of reaction products.

The following examples are typical of our process:

*Example I*

A run was made wherein a pressure tight reactor was charged with acetonitrile, purified by distillation from phosphorous pentoxide. To the charge was added 12 grams of sodium hydride per kilogram of acetonitrile. The temperature was then raised to 442° F. and maintained at that level for 3 hours with continuous agitation. At the end of 3 hours the reactor was allowed to cool to room temperature and the contents were codistilled with an odorless kerosene fraction boiling between 350 and 410° F. A per pass yield of 84.6 mol per cent of purified 4-amino-2,6-dimethylpyrimidine with a melting point of 359–360° F. was obtained.

*Example II*

A run was made wherein a pressure tight reactor was charged with acetonitrile purified by the method of Example I. To the charge was added 11 grams of sodium ethylate per kilogram of acetonitrile. The reactor was heated between 300 and 500° F. for 3 hours with agitation. After purification of the product according to the procedure of Example I, a per pass yield of 31.3 mol per cent of 4-amino-2,6-dimethylpyrimidine was obtained.

*Example III*

A run was made wherein a pressure tight reactor was charged with acetonitrile, purified by the method of Example I. To the charge was added 14 grams of calcium hydride per kilogram of acetonitrile. The reactor was heated between 400 and 450° F. for 5 hours with agitation. A per pass yield of 62.8 mol per cent of purified 4-amino-2,6-dimethylpyrimidine was obtained.

*Example IV*

A run was made wherein the reactor was charged with 255 grams of propionitrile and 4 grams of sodium hydride. The temperature was raised to 325° F. and maintained at that level for 5 hours. At the end of this period the following data regarding the reaction product was observed:

Unchanged propionitrile, grams_____ 119.8
Unchanged propionitrile, weight per cent_____ 47.0
4-amino-5-methyl-2,6-diethylpyrimidine, grams___ 117.7
4 - amino - 5 - methyl-2,6-diethylpyrimidine, weight
  per cent_____ 46.2
Ultimate yield, weight per cent_____ 87.1
Observed melting point of trimer product, ° F.
                                      378.5–380.3
Basicity constant at 25° C_____ 6.82

*Example V*

A run was made wherein the reactor was charged with 340 grams of phenylacetonitrile and 4 grams of sodium hydride. The temperature was raised to 325° F. for 5 hours, and the following data regarding the reaction product was observed:

Unchanged phenylacetonitrile, grams_____ 20
Unchanged phenylacetonitrile, weight per cent____ 5.9
4-amino-5-phenyl-2,6-dibenzylpyrimidine, grams___ 205
4 - amino - 5 - phenyl-2,6-dibenzylpyrimidine, weight
  per cent_____ 60.3
Decomposition residue, grams_____ 96.4
Decomposition residue, weight per cent_____ 28.4
Observed melting point of trimer products, ° F.
                                       221.9–223.7

*Example VI*

Three separate runs were made to polymerize acetonitrile and form 4-amino-2,6-dimethylpyrimidine, shown as trimer in the table hereinbelow, and the following reaction conditions and data were observed:

|  | Run No. 1 | Run No. 2 | Run No. 3 |
|---|---|---|---|
| Charge data: |  |  |  |
| Acetonitrile, grams | 630 | 600 | 610 |
| Sodium hydride, grams | 2 | 2 | 2 |
| Reaction conditions: |  |  |  |
| Temperature, °F | 325 | 325 | 300 |
| Duration, hrs | 4 | 5 | 5 |
| Product data: |  |  |  |
| Recovered acetonitrile, grams | 128.2 | 111.9 | 241.2 |
| Recovered acetonitrile, weight percent | 20.3 | 18.7 | 39.5 |
| Crude trimer, grams | 500.0 | 486 | 368 |
| Crude trimer, weight percent | 79.4 | 81.0 | 60.3 |
| Purified trimer, grams | 456 | 442 | 333 |
| Purified trimer, weight percent | 72.4 | 73.7 | 54.6 |
| Distillation Residue, grams | 36 | 33 | 29 |
| Distillation residue, weight percent | 5.1 | 5.5 | 4.8 |
| Ultimate yield, purified trimer, weight percent | 90.8 | 91.0 | 90.3 |

At a temperature of 325° F., runs of four and five hours' duration gave per pass yields of 72.4 and 73.7 weight per cent respectively. The ultimate yields were 90.8 and 91.0 weight per cent. A five hour run made at 300° F. gave a per pass yield of 54.6 weight per cent and an ultimate yield of 90.3 weight per cent. The yield figures given are for the purified trimer.

*Example VII*

The polymerization of acetonitrile was attempted in the presence of sodium cyanide, piperidine, and acetonitrile trimer (4-amino-2,6-dimethylpyrimidine) and the following reaction conditions and data were observed:

| Catalyst | Acetonitrile charged, grams | Catalyst charged, grams | Temperature | | Time, hours |
|---|---|---|---|---|---|
| | | | °F. | °C. | |
| Sodium cyanide | 50 | 1.0 | 300–500 | 149–260 | 6½ |
| Acetonitrile trimer | 49.6 | 1.0 | 250–300 | 121–149 | 6 |
| Piperidine | 410 | 5.0 | 450 | 232 | 17 |

In each of the runs made, essentially all of the acetonitrile charged was recovered unchanged.

Under the conditions employed for this investigation, sodium cyanide, 4-amino-2,6-dimethylpyrimidine and piperidine do not catalyze the trimerization of acetonitrile.

From the above disclosure numerous variations of our process well within the scope of our invention will be obvious to those skilled in the art.

This application is a continuation-in-part of our copending application Serial No. 63,845, filed December 6, 1948, now abandoned.

We claim:

1. In the preparation of 4-aminopyrimidines by heating a nitrile having a —C≡N group attached to a —CH$_2$— group with an alkaline condensing agent, the improvement wherein the nitrile is heated with a metal hydride as a catalyst for the reaction.

2. In the preparation of 4-aminopyrimidines by heating a nitrile having a —C≡N group attached to a —CH$_2$— group with an alkaline condensing agent, the improvement wherein the nitrile is heated with no more than 4 per cent by weight of a metal hydride as a catalyst for the reaction.

3. The improvement according to claim 2 wherein the pressure is sufficient to maintain the reactants in liquid phase.

4. The improvement according to claim 2 wherein the reactants and catalyst are contacted for a period of 0.5 to 20 hours at a temperature within the range of 150 to 550° F.

5. In the preparation of 4-aminopyrimidines by heating a nitrile having a —C≡N group attached to a —CH$_2$— group with an alkaline condensing agent the improvement wherein the nitrile is heated with from 0.01 to 4 per cent of a metal hydride as a catalyst for the reaction.

6. In the preparation of 4-aminopyrimidines by heating a nitrile having a —C≡N group attached to a —CH$_2$— group with an alkaline condensing agent the improvement wherein the nitrile is heated with from 0.01 to 4 per cent of an alkali metal hydride as a catalyst for the reaction 7. The improvement according to claim 6 wherein the alkali metal hydride is sodium hydride.

8. In the preparation of 4-aminopyrimidines by heating a nitrile having a —C≡N group attached to a —CH$_2$— group with an alkaline condensing agent the improvement wherein the nitrile is heated with from 0.01 to 4 per cent of an alkaline earth metal hydride as a catalyst for the reaction.

9. The improvement according to claim 8 wherein the alkaline earth metal hydride is calcium hydride.

10. The process for producing 4-amino-2,6-dimethylpyrimidine which comprises heating acetonitrile in the presence of from 0.01 to 4 weight per cent sodium hydride based on the acetonitrile at a temperature within the range of 150 to 550° F., and recovering the pyrimidine thus produced.

11. The process for producing 4-amino-2,6-dimethylpyrimidine which comprises heating acetonitrile in the presence of from 0.01 to 4 weight per cent calcium hydride based on the acetonitrile at a temperature within the range of 150 to 550° F., and recovering the pyrimidine thus produced.

12. The process for producing 4-amino-5-methyl-2,6-diethylpyrimidine which comprises heating propionitrile in the presence of from 0.01 to 4 weight per cent sodium hydride based on the propionitrile at a temperature within the range of 150 to 550° F., and recovering the pyrimidine thus produced.

13. The process for producing 4-amino-5-phenyl-2,6-dibenzylpyrimidine which comprises heating phenylacetonitrile in the presence of from 0.01 to 4 weight per cent sodium hydride based on the phenylacetonitrile at a temperature within the range of 150 to 550° F., and recovering the pyrimidine thus produced.

References Cited in the file of this patent

UNITED STATES PATENTS

| Number | Name | Date |
|---|---|---|
| 2,540,826 | Larchar | Feb. 6, 1951 |